(12) United States Patent
Huang et al.

(10) Patent No.: US 11,455,941 B2
(45) Date of Patent: Sep. 27, 2022

(54) CONTROL DEVICE, DISPLAY DEVICE AND OPERATION METHOD THEREOF

(71) Applicant: Nuvoton Technology Corporation, Hsinchu Science Park (TW)

(72) Inventors: Chun-Hao Huang, Hsinchu (TW); Yu-Che Hsieh, Tianjhong Township, Changhua County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/089,494

(22) Filed: Nov. 4, 2020

(65) Prior Publication Data
US 2021/0134216 A1 May 6, 2021

(30) Foreign Application Priority Data
Nov. 5, 2019 (TW) .................. 108140002

(51) Int. Cl.
*G09G 3/32* (2016.01)
*G09G 3/3208* (2016.01)
*G06F 3/14* (2006.01)

(52) U.S. Cl.
CPC .............. *G09G 3/32* (2013.01); *G09G 3/3208* (2013.01); *G06F 3/1446* (2013.01);
(Continued)

(58) Field of Classification Search
CPC ........... G09G 2352/00; G09G 2350/00; G09G 2360/04; G09G 3/32; G09G 2310/02;
(Continued)

(56) References Cited

U.S. PATENT DOCUMENTS

2015/0279267 A1* 10/2015 Tien ...................... H05B 45/30
345/690
2018/0295315 A1 10/2018 Kim

FOREIGN PATENT DOCUMENTS

CN 109062531 A 12/2018
TW I488172 6/2015
(Continued)

OTHER PUBLICATIONS

Office Action corresponding to TW Application No. 108140002, dated Jul. 15, 2020, 2 pages.

*Primary Examiner* — Jason M Mandeville
(74) *Attorney, Agent, or Firm* — Muncy, Geissler, Olds & Lowe, P.C.

(57) ABSTRACT

A control device includes a signal-output device, a signal modulation device, a storage device, and a processing device. The signal-output device outputs a plurality of data signals. The signal modulation device outputs a plurality of modulation signals. The storage device is coupled to the signal-output device and stores a large amount of display data. The processing device is coupled to the signal-output device and the signal modulation device. The processing device controls the signal-output device so that the signal-output device divides the display data and transforms the display data into the data signals according to the repeat performing number and the moving position region, so as to sequentially output the data signals. The processing device controls the signal modulation device, so that the signal modulation device sequentially outputs the modulation signals according to the pulse wave counting number and the pixel unit number.

10 Claims, 3 Drawing Sheets

(52) U.S. Cl.
CPC ... *G09G 2300/02* (2013.01); *G09G 2300/026* (2013.01); *G09G 2310/0275* (2013.01); *G09G 2350/00* (2013.01); *G09G 2352/00* (2013.01); *G09G 2360/04* (2013.01)

(58) Field of Classification Search
CPC ....... G09G 2310/0275; G09G 2300/02; G09G 2300/026; G09G 3/3208; G06F 3/1446
USPC ............................................ 345/1.1, 2.2, 55
See application file for complete search history.

(56) References Cited

FOREIGN PATENT DOCUMENTS

| | | |
|---|---|---|
| TW | I493442 | 7/2015 |
| TW | I545540 B | 8/2016 |
| TW | 201631566 A | 9/2016 |

\* cited by examiner

CONTROL DEVICE, DISPLAY DEVICE AND OPERATION METHOD THEREOF

CROSS REFERENCE TO RELATED APPLICATIONS

This application claims priority of Taiwan Patent Application No. 108140002, filed on Nov. 5, 2019, the entirety of which is incorporated by reference herein.

TECHNICAL FIELD

The present invention relates to a control device, and in particular it relates to a control device, a display device, and an operation method thereof.

BACKGROUND

Since the size of display screens using modern light-emitting diodes (LED) is gradually increasing, most LED display screens may use (and arrange) a plurality of small-scale LED modules to form a large-scale display screen.

In general, the data that is used to form an image needs to be divided through a control chip located outside of the module. In a traditional design, a high-level central processing unit (CPU) or a field programmable gate array (FPGA) is needed to perform a division process on the data, so as to drive a plurality of LED modules. However, the cost of the high-level CPU and the FPGA is relatively high, and a number of LED modules that can be driven is limited, and the display frames may not be synchronized. Therefore, how to improve the manner of driving the LED modules has become the focus of technical improvements by various manufacturers.

SUMMARY

An embodiment of the present invention provides a control device, a display device, and an operation method thereof, thereby effectively dividing the transmission of the display data, synchronizing the display time of each display unit to make the display device not produce a time difference, and decreasing the usage cost of circuit elements.

An embodiment of the present invention provides a control device, which includes a signal-output device, a signal modulation device, a storage device, and a processing device. The signal-output device is configured to output a plurality of data signals. The signal modulation device is configured to output a plurality of modulation signals. The storage device is coupled to the signal-output device, and configured to store a large amount of display data. The processing device is coupled to the signal-output device and the signal modulation device. The processing device controls the signal-output device, so that the signal-output device divides the display data and transforms the display data into data signals according to the repeat performing number and the moving position region, so as to sequentially output the data signals. The processing device controls the signal modulation device, so that the signal modulation device sequentially outputs the modulation signals according to the pulse wave counting number and the pixel unit number.

An embodiment of the present invention provides a display device, which includes a display module and a control device. The display module includes a plurality of display units, and each of the display units includes a plurality of pixel units. The control device includes a signal-output device, a signal modulation device, a storage device, and a processing device. The signal-output device is coupled to the display module, and configured to output a plurality of data signals. The signal modulation device is coupled to the display module, and configured to output a plurality of modulation signals. The storage device is coupled to the signal-output device, and configured to store a large amount of display data. The processing device is coupled to the signal-output device and the signal modulation device. The processing device controls the signal-output device, so that the signal-output device divides the display data and transforms the display data into data signals according to the repeat performing number and the moving position region, so as to sequentially output the data signals. The processing device controls the signal modulation device, so that the signal modulation device sequentially outputs the modulation signals according to the pulse wave counting number and the pixel unit number.

An embodiment of the present invention provides an operation method of a display device, which includes the following steps. A processing device is used to control a signal-output device, so that the signal-output device divides a large amount of display data and transforms the display data into a plurality of data signals according to the repeat performing number and the moving position region, so as to sequentially output the data signals to a plurality of display units of a display module. The processing device is used to control the signal modulation device so that the signal modulation device sequentially outputs a plurality of modulation signals to a plurality of pixel units in the display units according to the pulse wave counting number and the pixel unit number.

According to the control device, the display device and the operation method thereof disclosed by the present invention, the processing device controls the signal-output device, so that the signal-output device divides the display data and transforms the display data into the data signals according to the repeat performing number and the moving position region, so as to sequentially output the data signals, and the processing device controls the signal modulation device, so that the signal modulation device sequentially outputs the modulation signals according to the pulse wave counting number and the pixel unit number. Therefore, the embodiment of the present invention may effectively divide the transmission of the display data, synchronize the display time of each display unit to make the display device not produce a time difference, and decrease the usage cost of circuit elements.

BRIEF DESCRIPTION OF DRAWINGS

The present invention can be more fully understood by reading the subsequent detailed description and examples with references made to the accompanying drawings, wherein.

DETAILED DESCRIPTION OF DISCLOSED EMBODIMENTS

In each of the following embodiments, the same reference number represents an element or component that is the same or similar.

Figure 1:
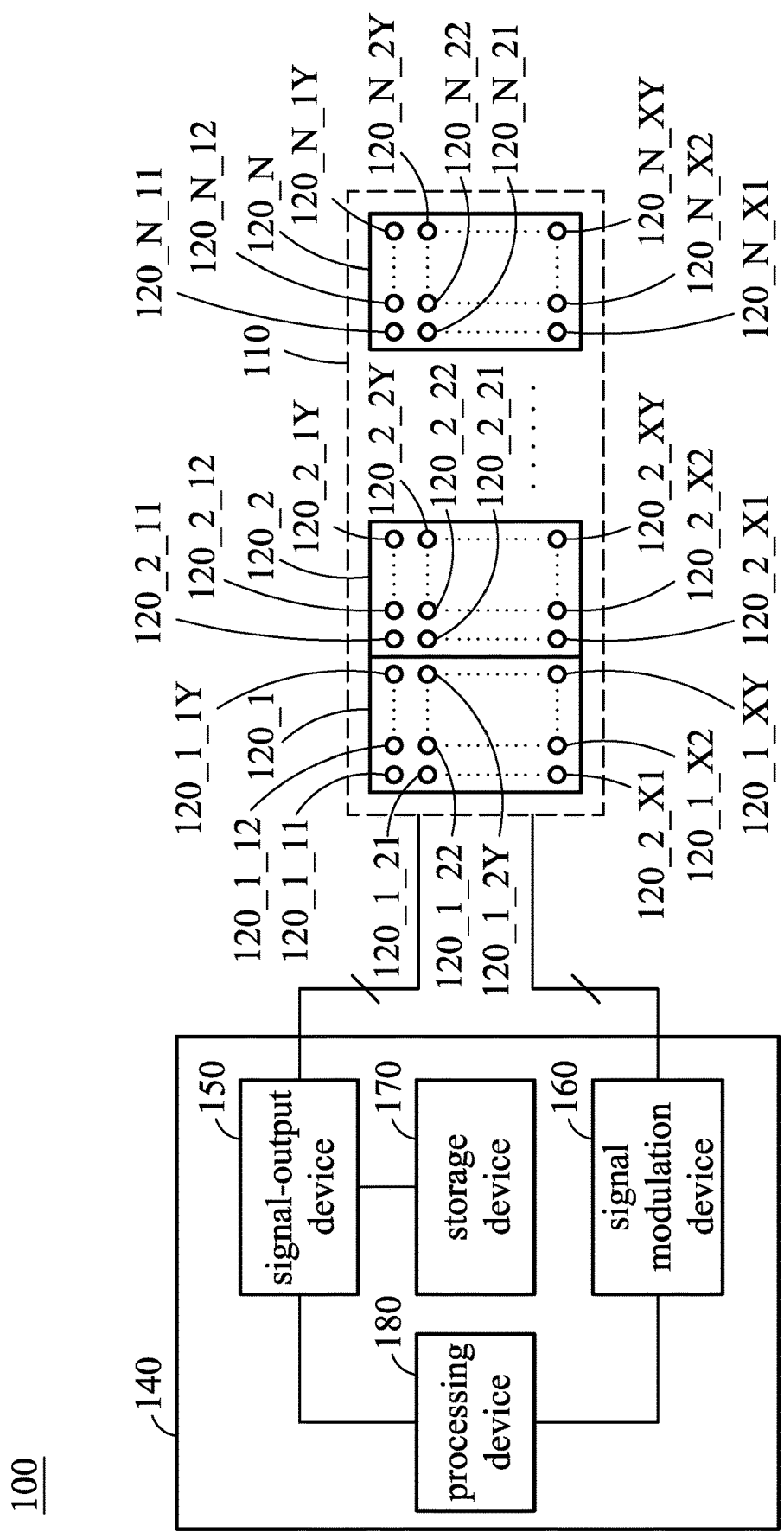
FIG. 1 is a schematic view of a display device according to an embodiment of the present invention.

FIG. 1 is a schematic view of a display device according to an embodiment of the present invention. Please refer to FIG. 1. The display device 100 includes a display module 110 and a control device 140. The display module 110 includes a plurality of display units 120_1~120_N, wherein N is a positive integer greater than 1. Each of the display units 120_1~120_N includes a plurality of pixel units 120_1_11~120_N_XY.

For example, the display unit 120_1 includes the pixel units 120_1_11, 120_1_12, . . . , 120_1_1Y, 120_1_21, 120_1_22, . . . , 120_1_2Y, 120_1_X1, 120_1_X2, . . . , 120_1_XY. The display unit 120_2 includes the pixel units 120_2_11, 120_2_12, . . . , 120_2_1Y, . . . , 120_2_21, 120_2_22, . . . , 120_2_2Y, 120_2_X1, 120_2_X_2, . . . , 120_2_XY. The display unit 120_N includes the pixel units, 120_N_11, 120_N_12, . . . , 120_N_1Y, 120_N_21, 120_N_22, . . . , 120_N_2Y, 120_N_X1, 120_N_X2, . . . , 120_N_XY.

In addition, X and Y are positive integer greater than 1, X is a number of rows of the pixel units 120_1_11~120_N_XY, and Y is a number of columns of the pixel units 120_1_11~120_N_XY. Furthermore, values of X and may be adjusted by the user according to the requirements thereof, so as to adjust the size of the display units 120_1~120_N. Moreover, each of the pixel units 120_1_11~120_N_XY includes a light-emitting diode (LED). In the embodiment, each of the display units 120_1~120_N is a small-scale LED display. In addition, the display device 100 is, for example, an LED backlight plane or an advertising light panel with a large-scale display screen.

The control device 140 includes a signal-output device 150, a signal modulation device 160, a storage device 170 and a processing device 180. The signal-output device 150 is configured to output a plurality of data signals to the display units 120_1~120_N. Then, after the display units 120_1~120_N receive the corresponding data signals, the display units 120_1~120_N may correspondingly store the display data of the data signals in storage devices (not shown) of the display units 120_1~120_N according to the data signals, for example. In the embodiment, the storage devices of the display units 120_1~120_N are respectively, for example, but not limited to, a static random access memory (SRAM).

The signal modulation device 160 is configured to output a plurality of modulation signals to the pixel units 120_1_11~120_N_XY of the display units 120_1~120_N, so that the display units 120_1~120_N correspondingly light up the light-emitting diode of each of the pixel units 120_1_11~120_N_XY, and the display module 110 may display the corresponding image frame. In the embodiment, the modulation signals outputted by the signal modulation device 160 are, for example, pulse width modulation (PWM) signals.

The storage device 170 is coupled to the signal-output device 150, and configured to store a large amount of display data. In the embodiment, the storage device 170 is, for example, a static random access memory, and the display data stored by the storage device 170 are the data that the display module 110 needs to display image. In addition, the user may pre-store the display data needed to be displayed in the storage device 170.

The processing device 180 is coupled to the signal-output device 150 and the signal modulation device 160. The processing device 180 controls the signal-output device 150, so that the signal-output device 150 divides the display data and transforms the display data into the data signals according to the repeat performing number and the moving position region, so as to sequentially output the data signals. In the embodiment, the repeat performing number corresponds to the number of display units 120_1~120_N in the display module 110, i.e., the repeat performing number is, for example, "N". In addition, the moving position region is a number of columns of the pixel units 120_1_11~120_N_XY of the display module 110, i.e., the moving position region is, for example, "Y".

In the embodiment, the signal-output device 150 may set a transmission initial position and a number of transmission of the display data in the storage device 170. In addition, the signal-output device 150 may divide the display data in the storage device 170 according to the repeat performing number and the moving position region, so that the display data in the storage device 170 may correspond to the pixel units 120_1_11~120_N_XY of the display units 120_1~120_N in the display module 110.

Figure 2:
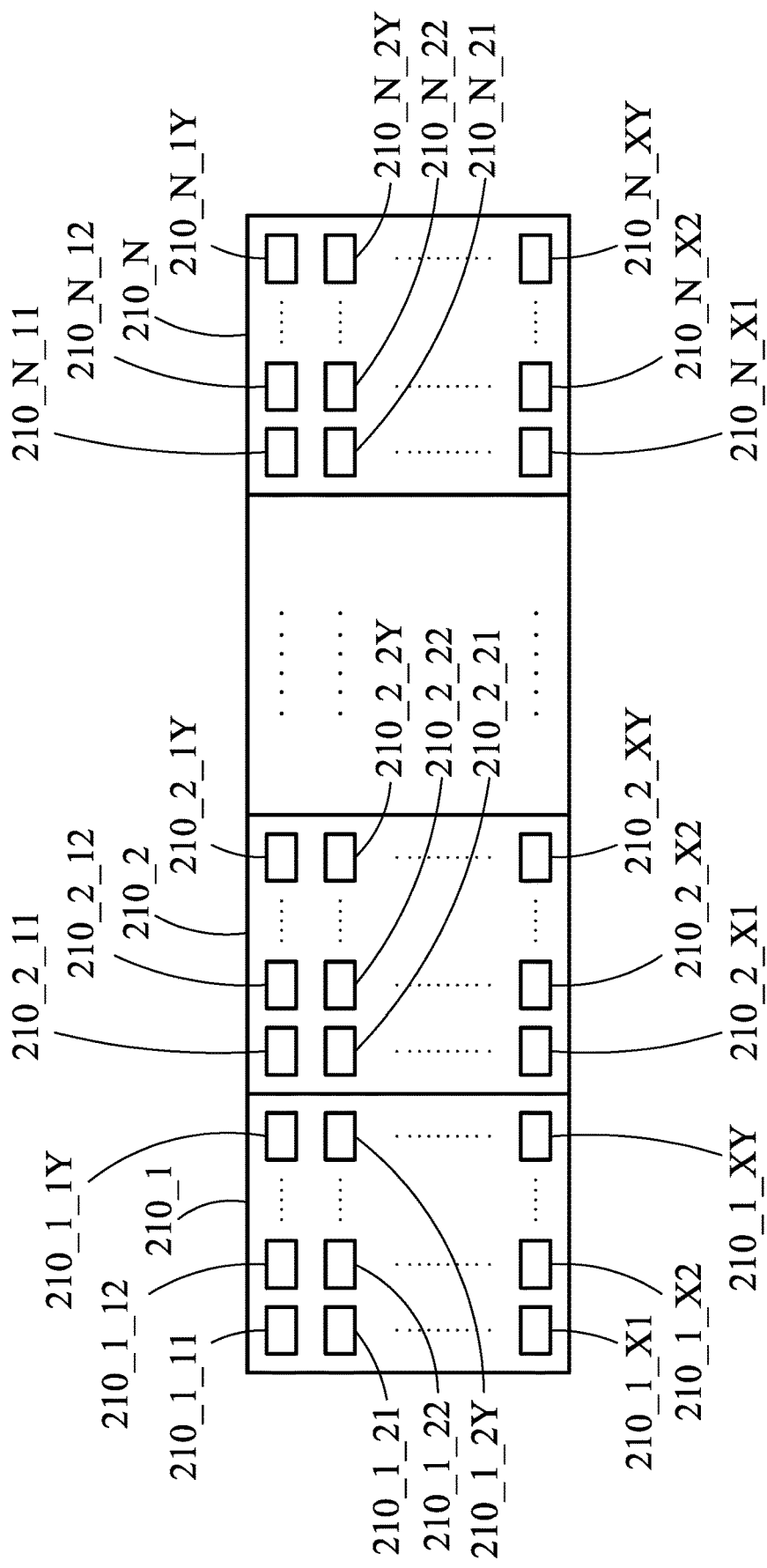
FIG. 2 is a schematic view of a large amount of display data in a storage unit according to an embodiment of the present invention.

For example, when the repeat performing number is "N" and the moving position region is "Y", the signal-output device 150 may use a stride mode to set and divide the display data stored by the storage deice 170, so that the storage device 170 is divided into blocks 210_1~210_N, and each of the blocks 210_1~210_N includes display data 210_1_11~210_N_XY, as shown in FIG. 2. In the embodiment, the blocks 210_1~210_N may correspond to the display units 120_1~120_N, respectively. For example, the block 210_1 corresponds to the display unit 120_1, the block 210_2 corresponds to the display unit 120_2, . . . , the block 210_N corresponds to the display unit 120_N.

In addition, the display data 210_1_11~210_N_XY may correspond to the pixel units 120_1_11~120_N_XY, respectively. For example, the display data 210_1_11 corresponds to the pixel unit 120_1_11, the display data 210_1_12 corresponds to the pixel unit 120_1_12, . . . , the display data 210_1_1Y corresponds to the pixel unit 120_1_1Y, the display data 210_1_21 corresponds to the pixel unit 120_1_21, the display data 210_1_22 corresponds to the pixel unit 120_1_22, . . . , the display data 210_1_2Y corresponds to the pixel unit 120_1_2Y, the display data 210_1_X1 corresponds to the pixel unit 120_1_X1, the display data 210_1_X2 corresponds to the pixel unit 120_1_X2, . . . , the display data 210_1_XY corresponds to the pixel unit 120_1_XY.

The display data 210_2_11 corresponds to the pixel unit 120_2_11, the display data 210_2_12 corresponds to the pixel unit 120_2_12, . . . , the display data 210_2_1Y corresponds to the pixel unit 120_2_1Y, the display data 210_2_21 corresponds to the pixel unit 120_2_21, the display data 210_2_22 corresponds to the pixel unit 120_2_22, . . . , the display data 210_2_2Y corresponds to the pixel unit 120_2_2Y, the display data 210_2_X1 corresponds to the pixel unit 120_2_X1, the display data 210_2_X2 corresponds to the pixel unit 120_2_X2, . . . , the display data 210_2_XY corresponds to the pixel unit 120_2_XY.

The display data 210_N_11 corresponds to the pixel unit 120_N_11, the display data 210_N_12 corresponds to the pixel unit 120_N_12, the display data 210_N_1Y corresponds to the pixel unit 120_N_1Y, the display data 210_N_21 corresponds to the pixel unit 120_N_21, the display data 210_N_22 corresponds to the pixel unit 120_N_22, . . . , the display data 210_N_2Y corresponds to the pixel unit 120_N_2Y, the display data 210_N_X1 corresponds to the pixel unit 120_N_X1, the display data 210_N_X2 corresponds to the pixel unit 120_N_X2, ..., the display data 210_N_XY corresponds to the pixel unit 120_N_XY.

Then, when the processing device 180 controls the signal-output device 150 to initialize, the signal-output device 150 may use a manner of a peripheral direct memory access (PADMA) to sequentially transform the display data in the storage device 170 into the data signals, and output the data signals to the corresponding display units 120_1~120_N.

For example, the signal-output device 150 may sequentially output the display data of the block 210_1 to the display unit 120_1 from the transmission initial position (such as "1"). That is, the signal-output device 150 sequentially outputs the data of the first row of the block 210_1 (i.e., the display data 210_1_11, 210_1_12, 210_1_1Y), the data of the second row of the block 210_1 (i.e., the display data 210_1_21, 210_1_22, 210_1_2Y), ..., the data of the X-th row of the block 210_1 (i.e., the display data 210_1_X1, 210_1_X2, 210_1_XY), so as to completely output display data of the block 210_1 to the storage device of the display unit 120_1.

After the signal-output device 150 outputs the display data of the block 210_1, the signal-output device 150 may add the transmission initial position (such as "1" and the moving position region "Y" to move to the block 210_2, so that the signal-output device 150 may sequentially output the display data of the block 210_2 to the display unit 120_2 from the transmission initial position (such as "1+Y"). That is, the signal-output device 150 sequentially outputs the data of the first row of the block 210_2 (i.e., the display data 210_2_11, 210_2_12, 210_2_1Y), the data of the second row of the block 210_2 (i.e., the display data 210_2_21, 210_2_22, 210_2_2Y), ..., the data of the X-th row of the block 210_2 (i.e., the display data 210_2_X1, 210_2_X2, 210_2_XY), so as to completely output display data of the block 210_2 to the storage device of the display unit 120_2.

After the signal-output device 150 outputs the display data of the block 210_2, the signal-output device 150 may add the transmission initial position (such as "1+Y") and the moving position region "Y" to move to the block 210_3, so that the signal-output device 150 may sequentially output the display data of the block 210_3 to the display unit 120_3 from the transmission initial position (such as "1+2Y"). The output manner of the display data of the block 210_3 may refer to the output manner of the display data of the block 210_1 and the block 210_2, and the description thereof is not repeated herein.

Then, the output manner of the display data of the remaining blocks 210_4~210_N according to the setting of the repeat performing number "N" and the moving position region "Y" may refer to the output manner of the display data of the block 210_1 and the block 210_2, so that the signal-output device 150 may complete the transmission of the display data of the display units 120_1~120_N.

Then, after the signal-output device 150 already transmits the display data in the storage device 170 to the corresponding display units 120_1~120_N, the signal-output device 150 may output, for example, a transmission completion signal, and the transmission completion signal is transmitted back to the processing device 180. Afterward, the processing device 180 may start to control the operation of the signal modulation device 160 according to the transmission completion signal.

Then, the processing device 180 controls the signal modulation device 160, so that the signal modulation device 160 sequentially outputs the modulation signals to the pixel units 120_1_11~120_N_XY of the display units 120_1~120_N according to the pulse wave counting number and the pixel unit number. In the embodiment, the pixel unit number is a number of columns of the pixel units 120_1_11~120_N_XY of the display units 120_1~120_N in the display module 110, i.e., the pixel unit number is, for example, "Y". In addition, the pulse wave counting number is a product of the pixel unit number and the bit number of one pixel unit. Assume that the pixel unit number is "Y", the bit number of one pixel unit is, for example, P bits, the pulse wave counting number is the product of the pixel unit number "Y" and the bit number "P", i.e., "Y*P", wherein P is a positive integer greater than 0. In addition, a value of P may be adjusted by the user according to the requirements thereof.

In the overall operation of the signal modulation device 160, the signal modulation device 160 may first output the modulation signals to the pixel units 120_1_11~120_1_1Y of the first row of the display unit 120_1, so as to light up the light-emitting diodes of the pixel units 120_1_11~120_1_1Y. In addition, the signal modulation device 160 may count at the same time. Then, when the value counted by the signal modulation device 160 is the same as the pulse wave counting number "Y*P", the signal modulation device 160 may stop outputting the modulation signals to the pixel units 120_1_11~120_1_1Y of the first row of the display unit 120_1.

Afterward, the signal modulation device 160 may output the modulation signals to the pixel units 120_2_11~120_2_1Y of the first row of the display unit 120_2, so as to light up the light-emitting diodes of the pixel units 120_2_11~120_2_1Y. Then, when the value counted by the signal modulation device 160 is the same as the pulse wave counting number "Y*P", the signal modulation device 160 may stop outputting the modulation signals to the pixel units 120_2_11~120_2_1Y of the first row of the display unit 120_2. Afterward, the signal modulation device 160 may uses the above-mentioned manner to sequentially output modulation signals to the pixel units 120_3_11~120_3_1Y, ..., 120_N_11~120_N_1Y of the first row of the remaining display units 120_3, ..., 120_N, so as to light up the emitting diodes of the pixel units 120_3_11~120_3_1Y, ..., 120_N_11~120_N_1Y.

When the signal modulation device 160 completes to output the modulation signals to the pixel units 120_1_11~120_1_1Y, ..., 120_N_11~120_N_1Y of the first row of the display units 120_1, ..., 120_N, the signal modulation device 160 may then output the modulation signals to the pixel units 120_1_21~120_1_2Y of the second row of the display units 120_1, so as to light up the light-emitting diodes of the pixel units 120_1_21~120_1_2Y. In addition, the signal modulation device 160 may also count at the same time. Then, when the value counted by the signal modulation device 160 is the same as the pulse wave counting number "Y*P", the signal modulation device 160 may stop outputting the modulation signals to the pixel units 120_1_21~120_1_2Y of the second row of the display unit 120_1.

Afterward, the signal modulation device 160 may output the modulation signals to the pixel units 120_2_21~120_2_2Y of the second row of the display unit 120_2, so as to light up the light-emitting diodes of the pixel units 120_2_21~120_2_2Y. Then, when the value counted by the signal modulation device 160 is the same as the pulse wave counting number "Y*P", the signal modulation device 160 may stop outputting the modulation signals to the pixel units 120_2_21~120_2_2Y of the second row of the display unit 120_2. Afterward, the signal modulation device 160 may uses the above-mentioned manner to sequentially output modulation signals to the pixel units 120_3_21~120_3_2Y, ..., 120_N_21~120_N_2Y of the second row of the remaining display units 120_3, ..., 120_N.

Then, the signal modulation device 160 may also uses the above-mentioned manner to sequentially output modulation signals to the pixel units 120_1_31~120_1_3Y, 120_2_31~120_2_3Y, ..., 120_N_31~120_N_3Y of the third row to the pixel units 120_1_X1~120_1_XY, 120_2_X1~120_2_XY, ..., 120_N_X1~120_N_XY of the X-th row of the remaining display units 120_1, 120_2, ..., 120_N, so as to light up the light-emitting diodes of the pixel units 120_1_31~120_N_XY. Therefore, the pixel units of the same row of each of the display units 120_1~120_N may synchronously receive the corresponding modulation signals to drive, so as to avoid that the pixel units of the same row have not completely receive the modulation signals and the modulation signals are outputted to the next row resulted in abnormal operation of displaying frame.

In addition, when the pixel units in the display units 120_1~120_N receive the corresponding modulation signals, the display units 120_1~120_N may light up the light-emitting diodes of the corresponding pixel units and is conjunction with the display data corresponding to each pixel of the storage device, so as to achieve the effect of synchronous display of the large-scale frame of the display device 100. Furthermore, in the embodiment of the present invention, the signal-output device 150 is used to divide the transmission of the display data of the display device 100 needed to be displayed without additional increase of other control chips, thereby effectively decreasing the usage cost of circuit elements.

Figure 3:
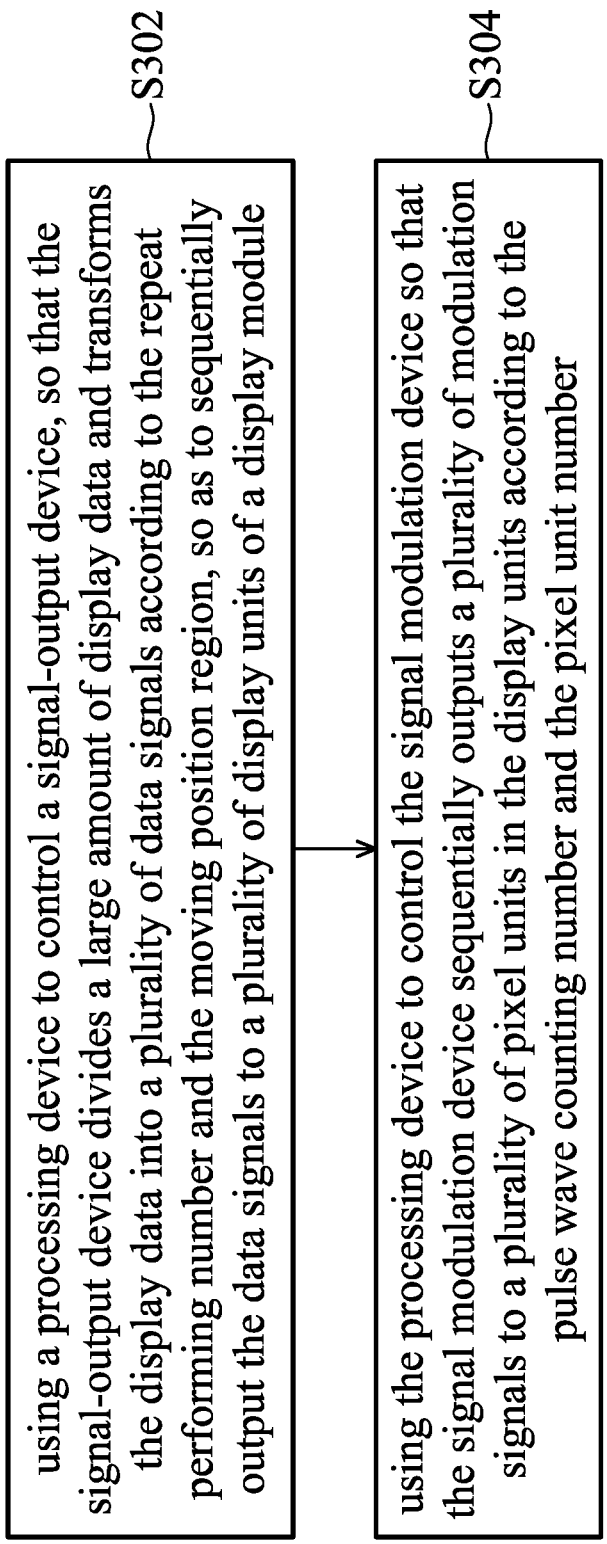
FIG. 3 is a flowchart of an operation method of a display device according to an embodiment of the present invention.

According to the above-mentioned description, the embodiment of the present invention additionally provides an operation method of a display device. FIG. 3 is a flowchart of an operation method of a display device according to an embodiment of the present invention. In step S302, the method involves using a processing device to control a signal-output device, so that the signal-output device divides a large amount of display data and transforms the display data into a plurality of data signals according to the repeat performing number and the moving position region, so as to sequentially output the data signals to a plurality of display units of a display module.

In step S304, the method involves using the processing device to control the signal modulation device so that the signal modulation device sequentially outputs a plurality of modulation signals to a plurality of pixel units in the display units according to the pulse wave counting number and the pixel unit number. In the embodiment, the repeat performing number corresponds to the number of display units of the display module, and the moving position region is a number of columns of the pixel units of the display module. In addition, the pixel unit number is a number of columns of the pixel units in the display units of the display module, and the pulse wave counting number is a product of the pixel unit number and the bit number of one pixel unit.

In summary, according to the control device, the display device and the operation method thereof disclosed by the embodiment of the present invention, the processing device controls the signal-output device, so that the signal-output device divides the display data and transforms the display data into data signals according to the repeat performing number and the moving position region, so as to sequentially output the data signals, and the processing device controls the signal modulation device, so that the signal modulation device sequentially outputs the modulation signals according to the pulse wave counting number and the pixel unit number. Therefore, the embodiment of the present invention may effectively divide the transmission of the display data, synchronize the display time of each display unit, so that the display device may not produce a time difference, and decrease the usage cost of circuit elements.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A control device, comprising:
a signal-output device, configured to output a plurality of data signals;
a signal modulation device, configured to output a plurality of modulation signals;
a storage device, coupled to the signal-output device, and configured to store a large amount of display data; and
a processing device, coupled to the signal-output device and the signal modulation device, wherein the processing device controls the signal-output device, so that the signal-output device divides the display data into to a plurality of blocks and transforms the display data of the plurality of blocks into the data signals according to a repeat performing number and a moving position region, and the signal-output device sequentially outputs the data signals in a row-sequence according to a transmission initial position and the moving position region, and the processing device controls the signal modulation device, so that the signal modulation device sequentially outputs the modulation signals according to a pulse wave counting number and a pixel unit number,
wherein the display data of the plurality of blocks correspond to rows and columns of a plurality of pixel units of a plurality of display units of a display module, and the display data of each of the plurality blocks are sequentially arranged in rows of each of the plurality of blocks in the row-sequence.

2. The control device as claimed in claim 1, wherein the repeat performing number corresponds to a number of the plurality of display units in the display module, and the moving position region is a number of columns of the plurality of pixel units in the display units.

3. The control device as claimed in claim 1, wherein the pixel unit number is a number of columns of the plurality of pixel units of the plurality of display units of the display module, and the pulse wave counting number is a product of the pixel unit number and a bit number of one pixel unit.

4. A display device, comprising:
a display module, comprising a plurality of display units, and each of the display units comprising a plurality of pixel units; and
a control device, comprising:
a signal-output device, coupled to the display units, and configured to output a plurality of data signals;
a signal modulation device, coupled to the display units, and configured to output a plurality of modulation signals;
a storage device, coupled to the signal-output device, and configured to store a large amount of display data; and a processing device, coupled to the signal-output device and the signal modulation device, wherein the processing device controls the signal-output device, so that the signal-output device divides the display data into a plurality of blocks and transforms the display data of the plurality of blocks into the data signals according to a repeat performing number and a moving position region, and the signal-output device sequentially outputs the data signals in a row sequence to the display units according to a transmission initial position and the moving position region, and the processing device controls the signal modulation device, so that the signal modulation device sequentially outputs the modulation signals according to a pulse wave counting number and a pixel unit number, wherein the display data of the plurality of blocks correspond to rows and columns of the plurality of pixel units, and the display data of each of the plurality of blocks are sequentially arranged in rows of each of the plurality of blocks in the row-sequence.

5. The display device as claimed in claim 4, wherein the repeat performing number corresponds to a number of display units, and the moving position region is a number of columns of the pixel units.

6. The display device as claimed in claim 4, wherein the pixel unit number is a number of columns of the pixel units in the display units of the display module, and the pulse wave counting number is a product of the pixel unit number and a bit number of one pixel unit.

7. The display device as claimed in claim 4, wherein the display units are light-emitting diode displays.

8. An operation method of a display device, comprising:

using a processing device to control a signal-output device, so that the signal-output device divides a large amount of display data into a plurality of blocks and transforms the display data of the plurality of blocks into a plurality of data signals according to a repeat performing number and a moving position region, and the signal-output device sequentially outputs the data signals in a row sequence to a plurality of display units of a display module according to a transmission initial position and the moving position region; and using the processing device to control a signal modulation device so that the signal modulation device sequentially outputs a plurality of modulation signals to a plurality of pixel units in the display units according to a pulse wave counting number and a pixel unit number, wherein the display data of the plurality of blocks correspond to rows and columns of the plurality of pixel units, and the display data in each of the plurality of blocks are sequentially arranged in rows of each of the plurality of blocks in the row-sequence.

9. The operation method of the display device as claimed in claim 8, wherein the repeat performing number corresponds a number of display units, and the moving position region is a number of columns of the pixel units.

10. The operation method of the display device as claimed in claim 8, wherein the pixel unit number is a number of columns of the pixel units in the display units of the display module, and the pulse wave counting number is a product of the pixel unit number and a bit number of one pixel unit.

* * * * *